United States Patent [19]

Lin

[11] Patent Number: 5,562,297
[45] Date of Patent: Oct. 8, 1996

[54] ENGAGEMENT BETWEEN A CONNECTING ELEMENT AND A FRONT FORK

[76] Inventor: Chun-San Lin, No. 6-11, Nanpei 1 St. Road., Tachia Town, Tai-Chung Hsien, Taiwan

[21] Appl. No.: 570,733

[22] Filed: Dec. 12, 1995

[51] Int. Cl.⁶ ........................................ B62K 25/08
[52] U.S. Cl. ................. 280/276; 188/24.21; 280/279
[58] Field of Search ................ 188/24.12, 24.21, 188/24.22; 280/264, 276, 277, 279, 280

[56] References Cited

U.S. PATENT DOCUMENTS

| | | | |
|---|---|---|---|
| 4,558,765 | 12/1985 | Hogan | 188/24.21 X |
| 5,238,259 | 8/1993 | Wilson et al. | 280/279 X |
| 5,449,189 | 9/1995 | Chen | 280/279 X |
| 5,472,220 | 12/1995 | Kameda et al. | 188/24.12 X |

*Primary Examiner*—Lee W. Young
*Attorney, Agent, or Firm*—Morton J. Rosenberg; David I. Klein

[57] ABSTRACT

An engagement between a connecting element and a front fork which has a crown portion and two shock absorbing devices are connected to the crown portion respectively, each one of the shock absorbing devices connecting to a connecting tube and the connecting tube connecting to an extending leg, each of the connecting tubes having a first support and a second support extending radially therefrom and the first and the second supports having a first and a second threaded holes respectively defined therein, a connecting element having two side plates and each of which having a first and a second holes defined therein and having a first and a second recesses defined in a surface facing to the first and the second supports so as to respectively receive the first and the second supports therein, a bolt extending through the first hole, the first recess and being engaged with the first threaded hole, a rod extending through the second hole, the second recess and being threadedly engaged with the second threaded hole by a threaded end of the rod, a brake arm pivotally engaged to the other end of the rod.

2 Claims, 4 Drawing Sheets

ENGAGEMENT BETWEEN A CONNECTING ELEMENT AND A FRONT FORK

BACKGROUND OF THE INVENTION

The present invention relates to an engagement between a connecting element of a brake assembly and a front fork of a bicycle.

FIG. 1 shows a front fork 50 of a bicycle, especially a front fork 50 having two shock absorbing means 53 disposed therein, the front fork 50 including a crown portion 54 from which two shock absorbing means 53 are connected and each one of the two shock absorbing means 53 connects one of two extending legs 51 of the front fork 50 by a connecting tube 52 disposed therebetween. The connecting element 40 is disposed across the two connecting tubes 52 by threadedly engaging two bolts 41 through the connecting element 40 and the respective connecting tube 52. A brake arm 60 having a first end and a second end which is connected to the brake cable 62, the first end thereof pivotally engaged to the connecting tube 52 by a pin 63 and located below the bolts 41. A brake pad 61 is connected between the first and the second ends of the brake arm 60 and extends toward the wheel (not shown) rotatably disposed between the two extending legs 51. When the brake cable 62 is pulled, the brake arm 60 being rotated about an axis of the pin 63 so as to push the brake pad 61 to stop the wheel.

However, the engagement between the connecting element 40 and the connecting tubes 52 is established by bolts 41 which extend through the connecting element 40 and a thin and tubular shell of the respective connecting tube 52, the bolts 41 thus tend to be loosened. Once the connecting element 40 is loosened, the spacing of the two brake pads from the wheel rim becomes unequal and this results in bending of the bicycle frame, uneven wear one the brake pads or unequal tension one the bicycle wheel spokes. When the two brake pads are spaced unequally from the sides of the wheel, they will apply unequal force as the bicycle brake are applied. This detracts markedly from braking efficiency, since the frictional force applied in one lateral direction is greater than that applied in the opposite direction, this could results in unequal wear on the brake pads and can force the bicycle wheel into a condition of misalignment.

The present invention intends to provide an improved engagement between the connecting element and the front fork so as to mitigate and/or obviate the above-mentioned problems.

SUMMARY OF THE INVENTION

The present invention provides an engagement between a connecting element and a front fork which has a crown portion and two shock absorbing means are connected to the crown portion respectively, each one of the shock absorbing means connecting to a connecting tube and the connecting tube connecting to an extending leg. Each of the connecting tubes has a first support and a second support extending radially therefrom and the first and the second supports having a first and a second threaded holes respectively defined therein.

A connecting element has two side plates and each of which has a first and a second holes defined therein and has a first and a second recesses defined in a surface facing to the first and the second supports so as to respectively receive the first and the second supports therein. A bolt extends through the first hole, the first recess and being engaged with the first threaded hole, a rod extending through the second hole, the second recess and being threadedly engaged with the second threaded hole by a threaded end of the rod, a brake arm pivotally engaged to the other end of the rod.

It is an object of the present invention to provide a secure engagement between the connecting element and the front fork.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
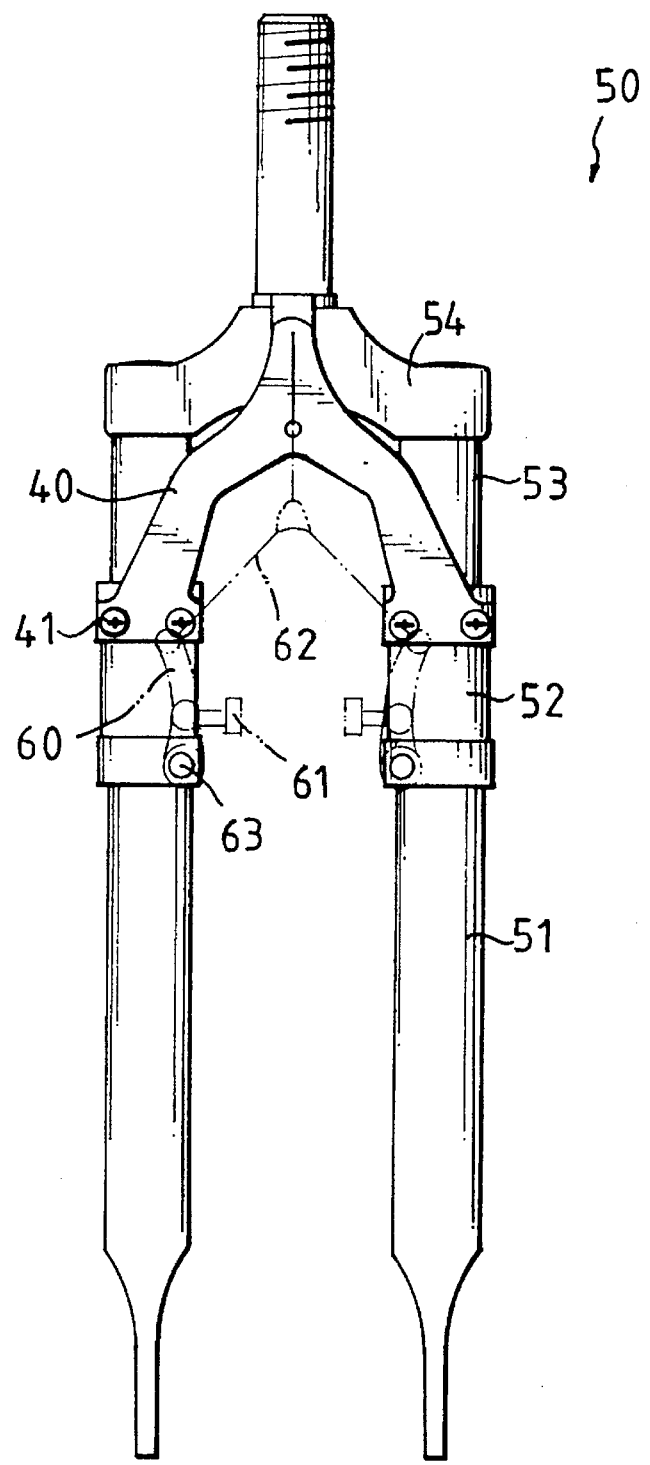
FIG. 1 is a front plane view of a conventional front fork with a conventional connecting element disposed thereto.
Figure 2:
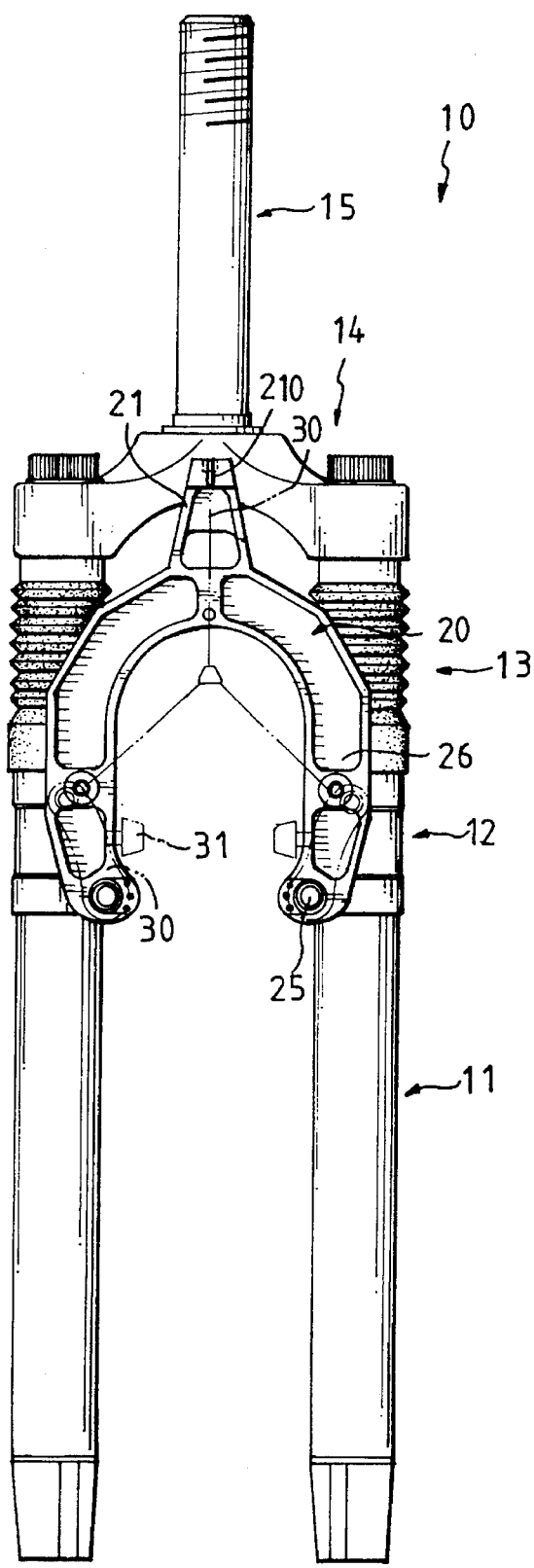
FIG. 2 is a front plane view of a front fork with a connecting element disposed thereto in accordance with the present invention.
Figure 3:
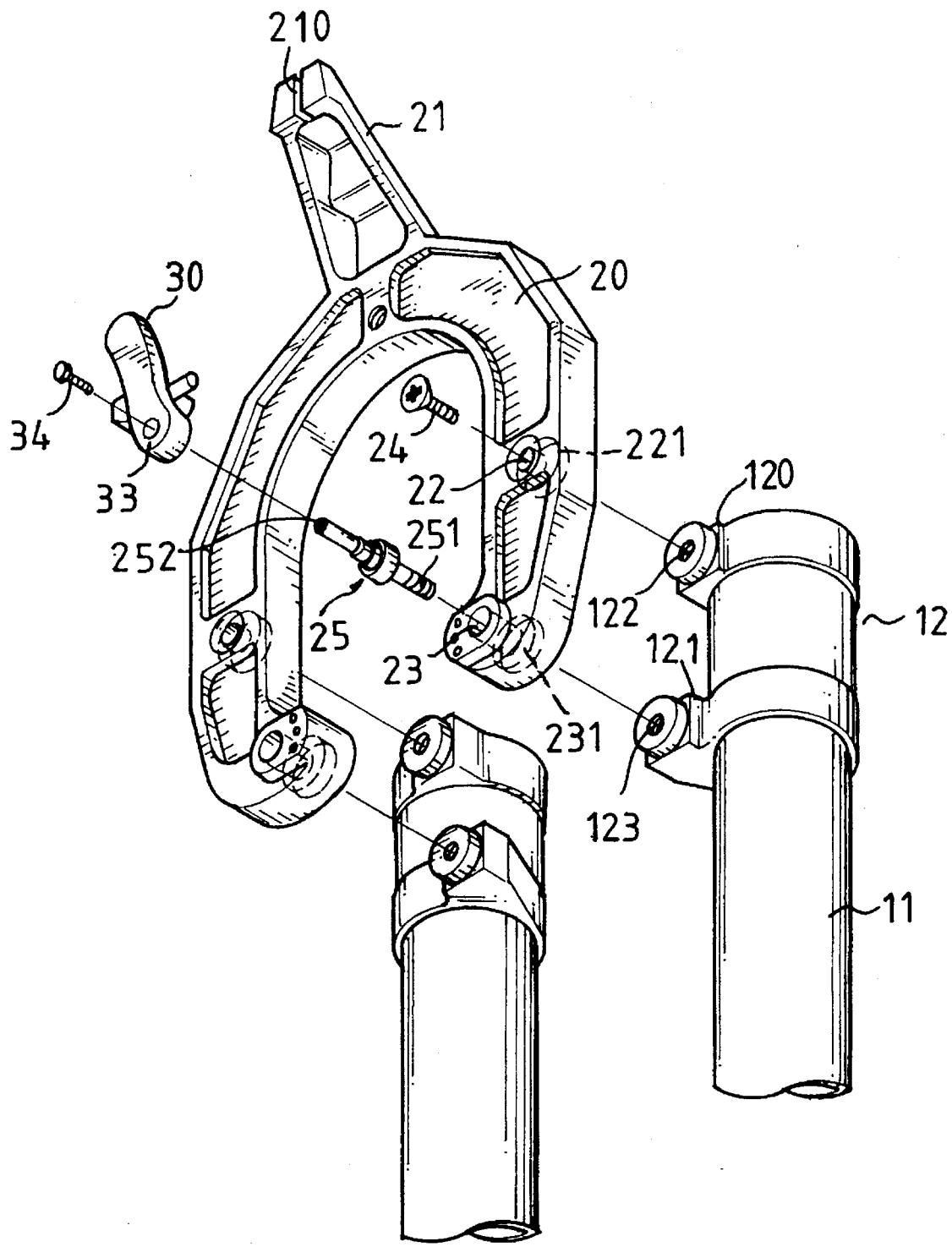
FIG. 3 is an exploded view of the connecting element and the front fork in accordance with the present invention.
Figure 4:
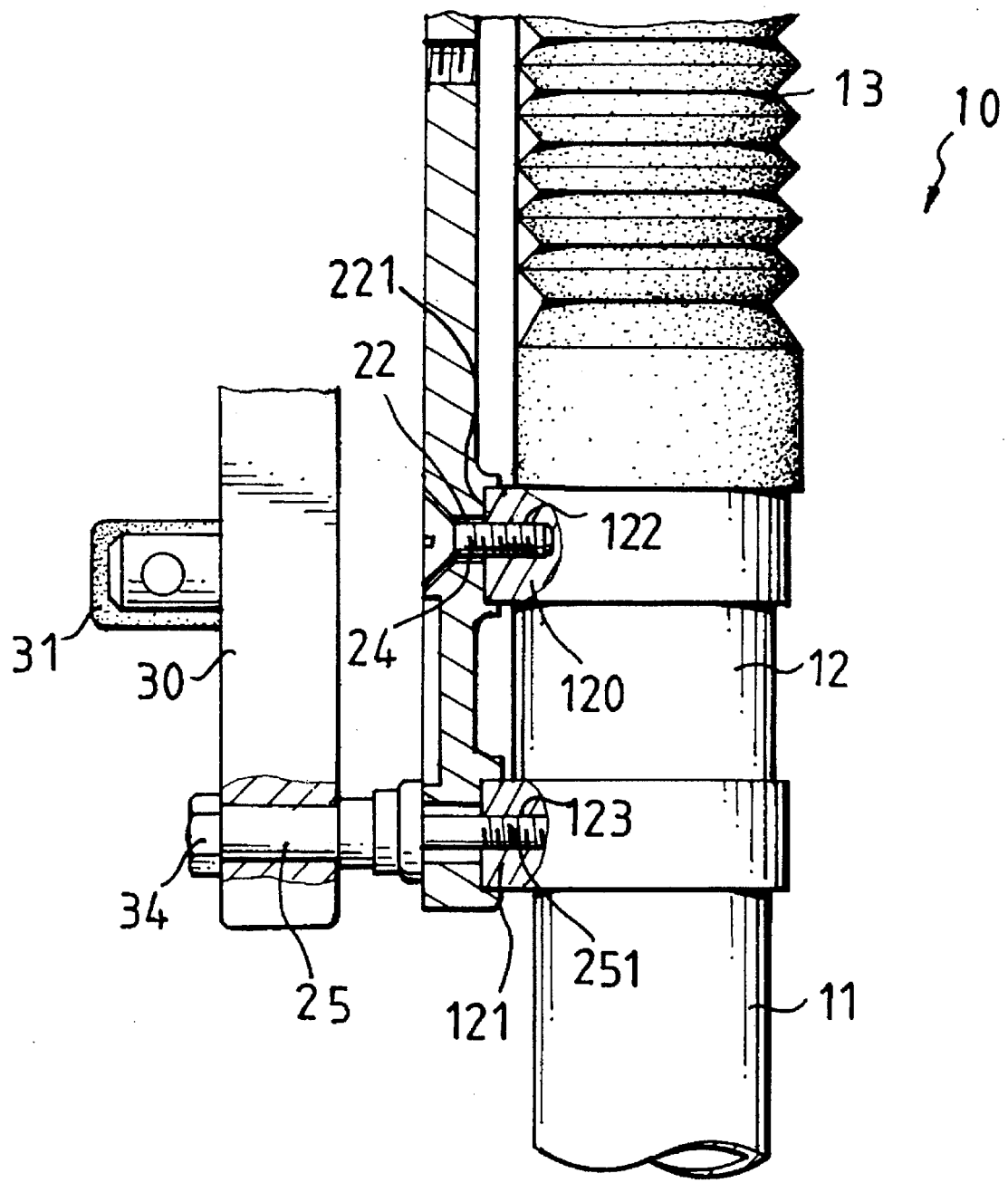
FIG. 4 is a side elevational view, partly in section, of the connecting element disposed to the front fork.

Referring to FIGS. 2 through 4, an engagement between a connecting element and a front fork in accordance with the present invention wherein the front fork 10 having a crown portion 14 from which a steerer tube 15 extends upwardly and two shock absorbing means 13 are respectively disposed to the crown portion 14, each one of the shock absorbing means 13 connecting to a connecting tube 12 to which an extending leg 11 connects. A connecting element 20 has a protrusion portion 21 and two side plates 26 so as to form the connecting element 20 to be a Y-shaped element, each of the side plates 26 connecting to the corresponding connecting tube 12. The protrusion 21 has a passage 210 defined therein so as to allow a brake cable 32 extending therethrough.

The connecting tube 12 has a first end and a second end, the first end thereof having a first support 120 extending radially therefrom and the second end thereof having a second support 121 extending radially therefrom. The first support 120 has a first threaded hole 122 defined therein and the second support 121 having a second threaded hole 123 defined therein.

Each one of the two side plates 26 of the connecting element 20 has a first hole 22 and a second holes 23 defined therein, each one of the side plates 26 having a first recess 221 and a second recess 231 defined therein and each of the first and the second recesses 221, 231 located in a surface facing to the first and the second supports 120, 121 of the connecting tube 12. The first recess 221 communicates with the first hole 22 and shares a common axis, the second recess 231 communicating with the second hole 23 and sharing a common axis. A length of the first support 120 in the radial direction is shorter than that of the second support 121 in the radial direction.

When assembling the connecting element 20 to the connecting tubes 12, the first support 120 being received in the first recess 221 and the second support 121 being received in the second recess 231. A bolt 24 extends through the first hole 22, the first recess 221 and threadedly engaged with the first threaded hole 122, and a rod 25 having a threaded end 251 extending through the second hole 23, the second recess 231 and threadedly engaged with the second threaded hole 123. A brake arm 30 has a first end and a second end, the firs end thereof having a hole 33 define therein so as to receive the other end of the rod 25 therein and a brake pad 31 is disposed between the two ends of the brake arm 30. The end opposite to the threaded end 251 of the rod 25 has a threaded recess 252 defined therein for a bolt 34 threadedly engaged therewith so as to pivotally engaged the brake arm 30 to the rod 25.

The brake cable 32 extending through the passage 210 has a first end connecting to a brake lever (not shown), a second connecting to the second end of one of the two brake arms 30 and a third end connecting to a second end of the other brake arm 30.

Accordingly, in according to a feature of the invention, the connecting element 20 can be securely engaged to the connecting tubes 12, furthermore, when assembling the connecting element 20 to the connecting tubes 12, the connecting element 20 is easily positioned by respectively inserting the first and the second supports 120 into the first and the second recesses 221, 231.

Although the invention has been explained in relation to its preferred embodiment, it is to be understood that many other possible modifications and variations can be made without departing from the spirit and scope of the invention as hereinafter claimed.

What is claimed is:

1. A combination of a connecting element and a front fork, said front fork having a crown portion from which a steerer tube extends upwardly and two shock absorbing means are respectively disposed to said crown portion, each one of said shock absorbing means connecting to a connecting tube to which an extending leg connects, said connecting element having two side plates and each of said side plates connecting to said corresponding connecting tube, wherein each said connecting tube having a first end and a second end, said first end thereof having a first support extending radially therefrom and said second end thereof having a second support extending radially therefrom, said first support having a first threaded hole defined therein and said second support having a second threaded hole defined therein;

each one of said two side plates of said connecting element having a first hole and a second hole defined therein, each one of said side plate having a first recess and a second recess defined therein and each of said first and said second recesses being located in a surface facing to said first and said second supports of said connecting tube, said first recess communicating with said first hole and sharing a common axis, said second recess communicating with said second hole and sharing a common axis such that said first support being received in said first recess and a bolt extending through said first hole, said first recess and threadedly engaged with said first threaded hole, said second support being received in said second recess and a rod extending through said second hole, said second recess and threadedly engaged with said second threaded hole by a threaded end of said rod, a brake arm pivotally engaged to the other end of said rod.

2. The combination as claimed in claim 1 wherein a length of said first support in a radial direction is shorter than that of said second support in said radial direction.

\* \* \* \* \*